United States Patent
Ochsenreither et al.

(10) Patent No.: US 11,500,355 B2
(45) Date of Patent: Nov. 15, 2022

(54) TERMINAL MODULE, HEAD MODULE, AND SYSTEM FOR COLLECTING DATA FROM AN AUTOMATION SYSTEM

(71) Applicant: Endress+Hauser Process Solutions AG, Reinach (CH)

(72) Inventors: Steffen Ochsenreither, Basel (CH); Uwe Mannbar, Village Neuf (FR)

(73) Assignee: Endress+Hauser Process Solutions AG, Reinach (CH)

( * ) Notice: Subject to any disclaimer, the term of this patent is extended or adjusted under 35 U.S.C. 154(b) by 27 days.

(21) Appl. No.: 17/259,670

(22) PCT Filed: Jun. 13, 2019

(86) PCT No.: PCT/EP2019/065448
§ 371 (c)(1),
(2) Date: Jan. 12, 2021

(87) PCT Pub. No.: WO2020/011480
PCT Pub. Date: Jan. 16, 2020

(65) Prior Publication Data
US 2021/0271228 A1    Sep. 2, 2021

(30) Foreign Application Priority Data

Jul. 12, 2018    (DE) .................... 10 2018 116 891.8

(51) Int. Cl.
*G05B 19/4155*    (2006.01)
*G06F 3/06*    (2006.01)
(Continued)

(52) U.S. Cl.
CPC ....... *G05B 19/4155* (2013.01); *G06F 3/0661* (2013.01); *G06F 13/387* (2013.01); *H04L 69/08* (2013.01); *G05B 2219/31368* (2013.01)

(58) Field of Classification Search
CPC ........... G05B 2219/31121; G05B 2219/25012; G05B 2219/31122; G05B 2219/31368;
(Continued)

(56) References Cited

U.S. PATENT DOCUMENTS

| 7,337,256 B2 | 2/2008 | Korowitz et al. |
| 2014/0226460 A1 | 8/2014 | Kretschmann et al. |

(Continued)

FOREIGN PATENT DOCUMENTS

| DE | 102009049378 A1 | 2/2011 |
| DE | 102014118389 A1 | 6/2016 |

(Continued)

*Primary Examiner* — Mansour Oveissi
(74) *Attorney, Agent, or Firm* — Mark A. Logan; Endress+Hauser (USA) Holding Inc.

(57) ABSTRACT

Disclosed is a system for collecting data from an automated plant having a field device connected for communication and for exchanging telegrams with a superordinate unit by means of a communication loop using a first protocol. The system includes a hat rail; and a terminal module mounted on the hat rail and embodied to monitor telegrams transmitted from the field device to the superordinate unit via the communication loop. The terminal module is further embodied to convert monitored telegrams into a second protocol and to output the converted telegrams. The system further includes a head module mounted on the hat rail and connected with the terminal module. The electronics unit of the head module is embodied to convert telegrams output from the terminal module into a third protocol to output them via the first network interface.

8 Claims, 1 Drawing Sheet

(51) Int. Cl.
  *G06F 13/38* (2006.01)
  *H04L 69/08* (2022.01)
(58) Field of Classification Search
  CPC . G05B 19/4155; G06F 13/387; G06F 3/0661; H04L 12/403; Y02P 90/02
  See application file for complete search history.

(56) References Cited

U.S. PATENT DOCUMENTS

| | | |
|---|---|---|
| 2016/0092388 A1 | 3/2016 | Sorenson et al. |
| 2019/0109726 A1* | 4/2019 | Pohl .................... H05K 7/1472 |

FOREIGN PATENT DOCUMENTS

| | | | |
|---|---|---|---|
| EP | 1096456 | A2 | 5/2001 |
| EP | 1317783 | B1 | 10/2006 |
| GB | 2477443 | A1 | 8/2011 |

* cited by examiner

TERMINAL MODULE, HEAD MODULE, AND SYSTEM FOR COLLECTING DATA FROM AN AUTOMATION SYSTEM

CROSS-REFERENCE TO RELATED APPLICATIONS

The present application is related to and claims the priority benefit of German Patent Application No. 10 2018 116 891.8, filed on Jul. 12, 2018 and International Patent Application No. PCT/EP2019/065448 filed on Jun. 13, 2019, the entire contents of which are incorporated herein by reference.

TECHNICAL FIELD

The invention relates to a terminal module, a head module and a system for collecting data from an automation system in the form of an automated plant, wherein the system for collecting data includes a head module of the invention and at least one terminal module of the invention.

BACKGROUND

Known in the state of the art are field devices, which are used in industrial plants. Field devices are often applied for process automation as well as for manufacturing automation. Referred to as field devices are, in principle, all devices, which are applied near to a process and which deliver, or process, process relevant information. Field devices are used for registering and/or for influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube, pipe or pipeline or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). Normally, the superordinated units are control units, such as, for example, a PLC (programmable logic controller). The superordinated units serve, among other things, for process control, as well as for commissioning of field devices. The measured values registered by field devices, especially by their sensors, are transmitted via the bus system to one or more superordinated unit(s), which, in given cases, process the measured values further and forward them to the control station of the plant. The control station serves for process visualizing, process monitoring and process control via the superordinated units. In addition, also a data transmission from a superordinated unit via the bus system to the field devices is required, especially for configuration and parametering of field devices as well as for operation of actuators.

For servicing field devices, corresponding operating programs (operating tools) are used, which run either on their own in the superordinated units (Endress+Hauser FieldCare, Pactware, AMS Fisher-Rosemount, PDM Siemens) or are integrated in applications of the control station (Siemens PSC7, ABB Symphony, Emerson Delta V).

In the course of the continued digitizing under the heading "Industrial Internet of Things (IIoT)" and "Industry 4.0", which certainly also involves components of process plants, there is an increased need to provide data from sensor systems, especially measurement data, diagnostic data, parameter values, etc. to a central location and from such data to provide added value (headings for this are "Big Data Analysis", "Predictive Maintenance", etc.). The central location is frequently a database contactable via the Internet, especially a so-called cloud-capable database. Typically transmitted into the database by means of Ethernet are data of the components, especially field devices, of the process plants.

A basic problem in the case of all such applications (IIoT, etc.) is the lack of connectivity of the field devices to the database, since the field devices in many existing plants communicate with the superordinated units by means of 4-20 mA technology and/or by means of HART technology. For this, the field devices are fashioned as two-wire field devices. Each of these field devices is connected by means of a separate communication loop with the superordinated unit, which is typically arranged in an electrical cabinet. Typically, the cables of the individual communication loops are connected in the electrical cabinet to a terminal block having individual terminal modules and connected from the terminal block with the superordinated unit. The terminal block, the superordinated unit and other components of the electrical cabinet are typically secured by mounting on hat rails. In 4-20 mA technology, the size of the process values ascertained by the field devices is transmitted to the superordinated units via varying energy values in the range from 4 to 20 mA corresponding to the present size of the process values. In HART technology, a supplemental digital signal is modulated onto the 4-20 mA signal.

In the case of new plants, this basic problem can, most often, be solved simply, since it can still be addressed in the planning phase. For already existing plants, indeed, gateways, which can convert the 4-20 mA signal, or the HART signal, are obtainable for solution of the problem. However, this introduces the problem of a greater wiring effort, since the gateway must be connected in parallel into each individual communication loop, for which purpose the communication loops must be individually opened. Likewise, sufficient space for this must be present in the electrical cabinet, this being for existing plants often not the case.

SUMMARY

Based on the above, an object of the invention is to provide a space saving solution, which enables data of a non-Ethernet-capable field device to be sent to a central location.

The object is achieved by a terminal module of the invention, a head module of the invention, and a system having the terminal module of the invention and the head module of the invention.

In the case of the terminal module, the object is achieved by a terminal module for mounting on a hat rail, wherein the terminal module has a connection region, to which a communication loop can be connected, via which telegrams can be transmitted using a first protocol, wherein the terminal module has contacts, which are embodied for connecting to another terminal module, and wherein the terminal module has an electronics module, which is embodied to receive via the connection region telegrams, which are transmitted by the communication loop, to convert telegrams received from the communication loop into a second protocol and to output converted telegrams via the contacts.

The terminal module is embodied basically like the conventional feed-through- or series, terminal blocks available, for example, from the firm, Phoenix Contact, or the firm, Wago. Such terminal blocks are embodied to be mounted on a hat rail. Terminal modules of the invention include an electronics module, in contrast to the known feed-through- or series, terminal blocks. With the help of this electronics module, a terminal module of the invention can, in simple manner, register and forward data of a field device. The electronics module is, for this purpose, embodied to monitor the data traffic traveling via the communication loop. Such data traffic is then converted into a second protocol, especially into a proprietary protocol, and output via contacts, which the terminal module of the invention has in contrast to conventional feed-through- or series, terminal blocks.

The communication loop is a two-wire communication loop. Such is especially connected to a field device of automation technology. A communication loop in the sense of present invention uses 4-20 mA technology or HART technology. It can be provided to use the communication loop also with additional, suitable communication technologies. Field devices suitable for use in connection with the invention have already been named, by way of example, above in the introductory portion of the description.

In an advantageous embodiment of the terminal module of the invention, it is provided that the electronics module includes a memory, which has identification information of the terminal module. Such can be output via the contacts supplementally to the telegrams converted into the second protocol. It can be provided that the identification information can be edited, for example, to include the name of the field device.

Regarding the head module, the object is achieved by a head module for mounting on a hat rail, wherein the head module has contacts, which are embodied for connecting to contacts of a terminal module, wherein the head module has a first network interface, which is embodied for connecting to a communication network, which uses a third protocol, wherein the head module has an electronics module, which is embodied to receive, transmitted from the terminal module via the contacts, telegrams, which have a second protocol, to convert them into a third protocol and to output them via the first network interface.

The head module is embodied as regards its dimensions equal to, or at least similar to, a terminal module of the invention. The telegrams converted and output by a terminal module are received, in given cases, collected, by the head module, converted into a third protocol, especially Ethernet, and output via the first network interface. Connected to the network interface is especially an Ethernet-based network, for example, the Internet, which is connected with a database, especially a cloud capable database, to which the converted telegrams are transmitted. The head module has especially no connection region for connection with a communication loop.

In an advantageous embodiment of the head module of the invention, it is provided that the head module has a connection for energy supply unit and an energy distribution unit, which is connected with the connection and the contacts of the head module. In this way, on the one hand, the head module is supplied with its electrical energy required for operation. On the other hand, it is in this way possible to supply terminal modules of the invention with electrical energy required for their operation.

In a preferred embodiment of the head module of the invention, it is provided that the head module includes a Web server. It is, for example, provided to connect a service unit to the head module. The service unit can access the Web server of the head module and read out (via a terminal module) telegrams of a field device or configure the head module.

In an advantageous embodiment of the head module of the invention, it is provided that the head module has a second network interface. The second network interface can, on the one hand, have the same function as the first network interface, thus, the outputting of converted telegrams of the field devices. Alternatively, the network interface can be embodied to allow a device connected to the second network interface, for example, the above mentioned service unit, access to the Web server.

Regarding the system, the object is achieved by a system for monitoring an automated plant, wherein present in the plant is at least one field device, which is connected for communication and exchanges telegrams with a superordinated unit by means of a communication loop using a first protocol, especially HART, comprising:
  a hat rail;
  at least one terminal module mounted on the hat rail and embodied to monitor telegrams transmitted from the field device to the superordinated unit via the communication loop, to convert monitored telegrams into the second protocol, and to output converted telegrams; and
  a head module mounted on the hat rail, and wherein the terminal module is connected by means of its contacts with the contacts of the head module and wherein the electronics unit of the head module is embodied to convert telegrams output by the terminal module into a third protocol, especially Ethernet, and to output them via the first network interface.

The system of the invention offers the significant advantage that data from field devices can be sent in simple manner to an Ethernet based network, especially for IIoT applications, even though the field devices do not support Ethernet in conventional manner. Another significant advantage is the small space requirement required for this solution. Conventionally, feed-through- or series, terminal blocks are already located in an electrical cabinet for connecting the communication loops of the field devices with superordinated units. These terminal blocks need only be replaced by terminal modules of the invention. The terminal modules of the invention also provide connection of the field devices to the superordinated unit. In addition, the data of the field devices can be monitored and conditioned Ethernet conformally.

In an advantageous, further development, the system includes supplementally a closure module, wherein the closure module is mounted on the hat rail and is embodied in such a manner that it is connectable with the contacts of the terminal module and upon connection with the contacts of the terminal module forms an electrical current loop composed of the head module, the terminal module and the closure module. The electrical current loop is in this way closed. The source and the drain of the electrical current loop are located especially in the head module.

In an advantageous, further development, the system includes supplementally other terminal modules, each of which is connected with an additional communication loop of an additional field device and is located between the head module and the closure module, wherein the contacts of the additional terminal modules contact in such a manner that the electrical current loop includes the additional terminal modules and wherein the additional terminal modules are embodied to forward converted telegrams of the terminal module and, especially, to receive, to convert and to transfer to the head module telegrams of their communication loops. In this way, telegrams of a number of field devices, and a corresponding number of communication loops, can be received, monitored, and output via the first network interface. Thus, a number of terminal modules of the invention can be used. Only one head module and one closure module are required.

The contacts of the individual terminal modules are embodied in such a manner that such form one shared line between the closure module and the head module, and, thus, for a closed electrical current loop. The terminal modules, which lie between a terminal module, which at the moment transmits a telegram converted into the second protocol, and the head module are embodied in such a manner that they forward the telegram transmitted from the initiating terminal module along the terminal modules, so that the telegram reaches the head module.

Besides terminal modules of the invention, also conventional feed-through- or series, terminal blocks can be mounted on the hat rail between the head module and the closure module. These serve for the conventional purpose of terminals in the electrical cabinet—to connect the communication loops of field devices to a superordinated unit. They do not have electronics units. It must, however, then be assured that the conventional feed-through- or series, terminal blocks use the same type of contacts used by the terminal modules of the invention. Only then is the electrical current loop not interrupted and telegrams can be transmitted from the terminal modules to the head module.

In an advantageous embodiment of the system of the invention, it is provided that the energy distribution unit of the head module is embodied to supply the terminal module and the additional terminal modules with electrical energy. In this way, all terminal modules can be supplied with the electrical energy required for their operation, without requiring that the terminal modules have their own energy supplies.

In an advantageous, further development, the system of the invention supplementally includes a service unit, which is connected to the second network interface of the head module and which is embodied to access the Web server of the head module and via such to retrieve data from the head module. The data can be, for example, telegrams from individual field devices connected to the terminal modules. It can, however, also be status information of the field devices. The service unit is, for example, a service unit in the sense of the "Field Xpert" tablet PC produced and sold by the applicant. It can even be a computer unit, for example, a laptop, or a mobile end device, for example, a tablet or a smart phone. Preferably, it is provided that the service unit communicates with the Web server via the FDT standard.

In a preferred embodiment of the system of the invention, it is provided that the electronics unit is embodied to check the presence of terminal modules, wherein in the course of the checking the identification information of terminal modules is queried.

In an advantageous embodiment of the system of the invention, the head module contains an optical indicator, wherein the electronics unit of the head module is embodied in such a manner that it checks for presence of the closure module, and wherein the optical indicator is embodied in the case of presence of the closure module to emit an optical signal. Thus, in simple manner—without that a connecting of a service unit would be required—it is evident, whether the electrical current loop is closed or whether a failure is present and the connections between the individual components must be checked.

In a preferred embodiment of the system of the invention, it is provided that the Web server of the head module is embodied in such a manner that such presents the present terminal modules with their corresponding identification information and/or provides such for query. The identification information of all detected terminal modules can, for example, be queried via the Web server. The identification information can, moreover, be edited via the Web server. Furthermore, it can be provided to link the identification information of the terminal modules with identification information of the field device connected with a terminal module.

In an advantageous embodiment of the system of the invention, it is provided that the system is embodied in such a manner that the service unit enables a servicing of the field device, wherein the service unit is embodied to transfer a service telegram to the head module, wherein the head module is embodied to convert the service telegram into a telegram conforming to the second protocol and to transfer such to the terminal module, wherein the terminal module is embodied to convert the telegram into a telegram conforming to the first protocol and to transmit such via the communication loop into the field device. In this way, a field device can be serviced by means of the service unit. Servicing in the sense of present invention refers to a querying of measured values, parameter values, identification information and/or diagnostic information of the field device, or a parametering of the field device. The service unit is, in such case, especially connected to the second network interface of the head unit.

Furthermore, it can be provided that the field devices can be accessed by means of the database. The database is, in such case, connected by means of an Ethernet network to the first network interface of the head unit. Depending on need, the database can exercise the same service functions described for the service unit. Alternatively, it can be provided that the above service functions are not permitted, but updating functionalities are activated, which are not enabled by means of the service unit. The updating functionalities comprise, for example, an updating of the firmwares of the field devices and/or an updating of the Web server of the head unit.

BRIEF DESCRIPTION OF THE DRAWINGS

The invention will now be explained in greater detail based on the appended drawing, the figures of which show as follows.

DETAILED DESCRIPTION

Figure 1:
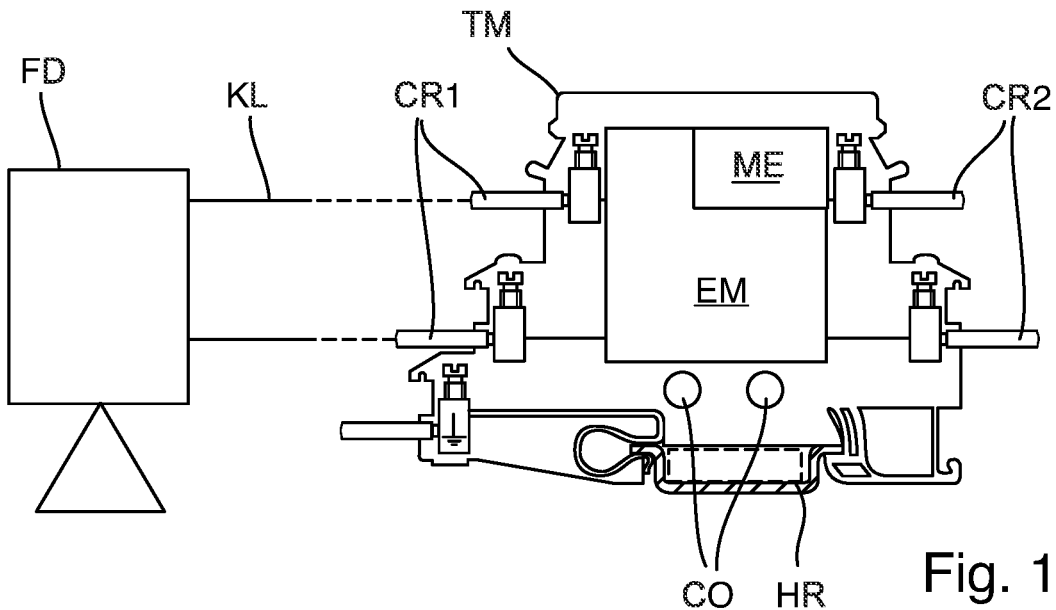
FIG. 1 shows a schematic cross section of a terminal module of the present disclosure.

FIG. 1 shows a schematic cross section of a terminal module TM, such as applied in the sense of invention. The terminal module TM corresponds in its dimensions essentially to a feed-through- or series, terminal block of the kind available commercially in various embodiments. Terminal module TM includes a cavity, by means of which it can be mounted on a hat rail HR. A hat rail HR is installed in the present case in electrical cabinets of automated plants.

The terminal module TM includes a first connection region CR1 and a second connection region CR2. Connected to the first connection region CR1 is a communication loop KL, which comes from a field device FD. The first connection region CR1 is connected through the housing of the terminal module TM with the second connection region CR2, which serves for connecting to a superordinated unit, for example, a programmable logic controller (PLC). The terminal module TM serves, consequently, as a usual feed-through- or series, terminal block for connecting a communication loop KL to a superordinated unit, in order to bring data traffic transmitted on the communication loop to the connections of the superordinated unit.

In contrast with conventional terminal blocks known in the state of the art, the terminal module TM shown in FIG. 1 includes an electronics module EM and additional contacts CO. The electronics module serves for monitoring telegrams transmitted via the communication loop KL. In the present example, these are HART telegrams. The monitored telegrams are then converted by the electronics module EM corresponding to a proprietary protocol and can be output via the contacts CO. The terminal module TM is, moreover, fed via the contacts CO with electrical energy required for its operation.

Figure 2:
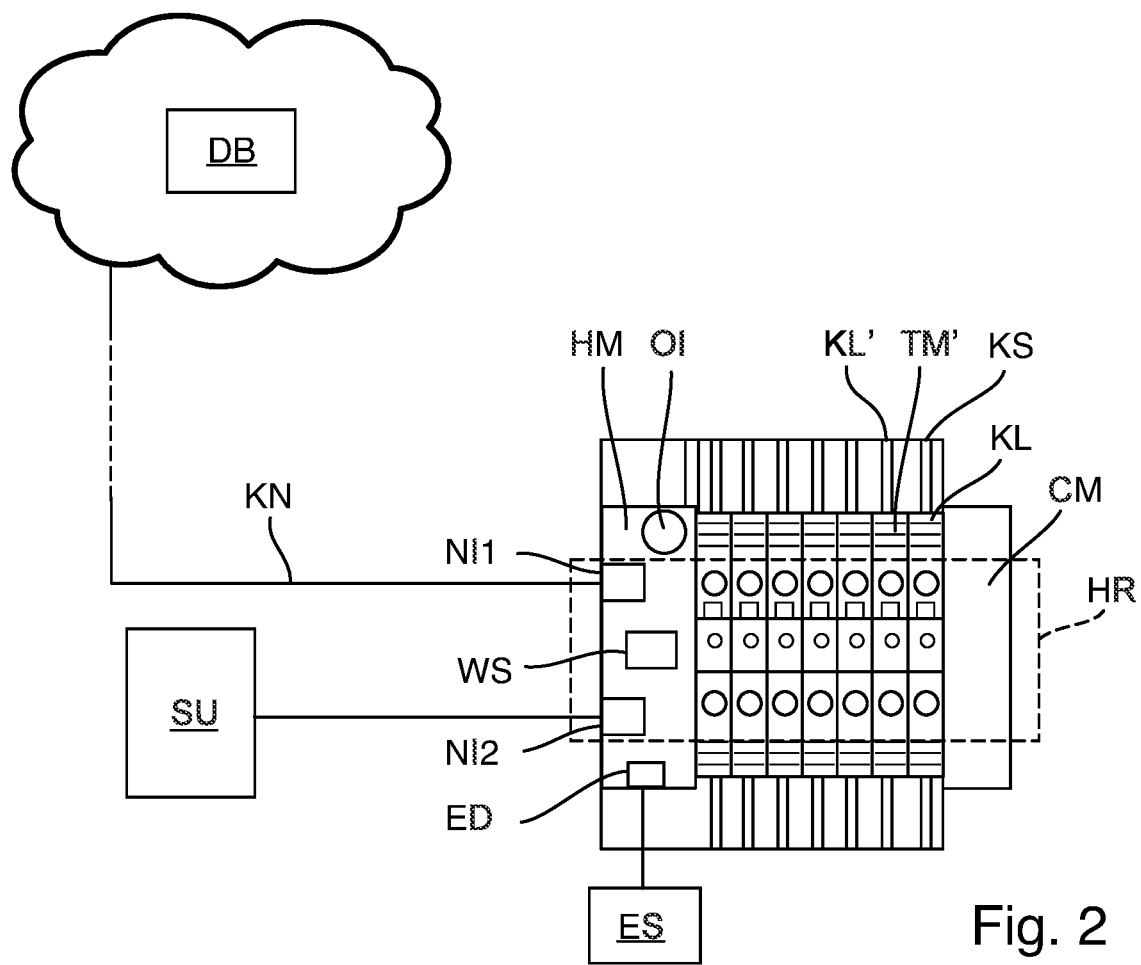
FIG. 2 shows an example of an embodiment of a system of the present disclosure.

FIG. 2 shows an example of an embodiment of the system of the invention. Besides the terminal module shown in FIG. 1, also mounted on the hat rail HR are other terminal modules TM', a head module HM and a closure module CM. As in the case of the terminal module TM, these additional components have the same contacts CO in equivalent position so that neighboring contacts of the components contact when the components are correctly mounted on the hat rail. In this way, a closed electrical current loop is formed, which begins in the head module HM, leads along the terminal modules TM, TM', extends through the closure module CM and back along the terminal modules TM, TM' to end at the head module.

The electrical energy required for operating the head module HM and the terminal modules TM, TM' is fed by an energy supply unit ES into the head module HM. An energy distribution unit ED contained in the head module serves for supplying the terminal modules TM, TM' via the electrical current loop with electrical energy obtained from energy supply unit ES. Advantageously, the closure module CM is embodied as a passive component. The presence of the closure module CM and, thus, a correctly closed electrical current loop is displayed by an optical indicator 01, for example, in the form of a light emitting diode, installed in the head module HM.

If the system is correctly established, then the terminal module TM can transmit the telegram converted into the proprietary protocol via the electrical current loop to the head module HM. The additional terminal modules pass the telegrams through. By means of an electronics module contained in the head module HM, the telegrams are received and converted into another protocol. The telegrams, converted anew, can then be transmitted on a communication network KN. For this, the head module HM includes a first network interface NI1, which serves for connecting to a wireless or a wired, communication network KN. In the case of a wired communication network, such is especially an Ethernet-based communication network. In the case of a wireless communication network, such is a wireless network embodied according to one of the customary standards, for example, Bluetooth or WiFi.

The converted telegrams are transmitted via the communication network to a cloud-based database DB. Runnable in this are applications, especially IIoT-type applications, which further process and analyze the received telegrams and, thus, the data received from a field device. The database can also be enabled via the system of the invention to access a field device and, for example, update its firmware.

Furthermore, the head module includes another network interface NI2, which serves for connecting a service unit, for example, a mobile end device or a laptop, to the head module HM, especially based on FDT technology. The head module HM enables the service unit SU then to access a Web server WS integrated in the head module HM. The Web server WS presents to the service unit, for example, all present, "intelligent", terminal modules TM, TM'. To this end, the head module conducts a scan and reads the identification information of the terminal modules TM, TM' contained in memories ME of the terminal modules TM, TM'. The Web server WS presents, moreover, current telegrams received from the terminal modules TM, TM' combined with the identification information.

By means of the service unit SU, moreover, a servicing of the field device FD is enabled. The service unit transmits for this purpose a service telegram to the head module HM. The head module HM then converts the service telegram into a telegram conforming to the proprietary protocol and transmits this to the corresponding terminal module TM. The terminal module TM, in turn, converts this telegram into a telegram conforming to the first protocol and transmits this via the communication loop KL to the field device FD. The in given cases resulting response telegram is transmitted in the reverse direction from the field device FD to the service unit SU. Servicing in the sense of present invention referred to a querying of measured values, parameter values, identification information and/or diagnostic information of the field device FD, or a parametering of the field device FD.

Besides the described terminal module TM, a number of other terminal modules of the invention can are used in the system, each of which is connected on another communication loop KL' with, in each case, an additional field device.

Besides the terminal modules of the invention TM, TM', moreover, also conventional feed-through- or series, terminal blocks can be installed on the hat rail HR between the head module HM and the closure module CM. These serve for conventional purposes of terminals in the electrical cabinet—to connect the communication loop KL, KL' of a field device FD to a superordinated unit—and have no electronics module EM. It must, however, be provided that the conventional feed-through- or series, terminal blocks have the same type contacts CO that the terminal modules of the invention TM, TM' have. Only then is the electrical current loop not interrupted and telegrams can be transmitted from the terminal modules TM, TM' to the head module HM.

The invention claimed is:

1. A system for collecting data from an automated plant, wherein present in the plant is at least one field device that is connected for communication and for exchanging telegrams with a superordinate unit by means of a communication loop using a first protocol, the system comprising:
   a hat rail;
   a terminal module, including:
      a connection region to which a communication loop is connectable, via which telegrams can be transmitted using the first protocol;
      contacts that are embodied for connecting to another terminal module; and an electronics module that is embodied to receive via the connection region the telegrams that are transmitted by the communication loop, to convert the telegrams received from the communication loop into a second protocol, and to output the converted telegrams via the contacts;

wherein the terminal module is mounted on the hat rail and is embodied to monitor telegrams transmitted from the at least one field device to the superordinate unit via the communication loop, to convert monitored telegrams into the second protocol, and to output converted telegrams; and a head module, including:
contacts that are embodied for connecting to contacts of the terminal module;
a first network interface that is embodied for connecting to a wired or a wireless communication network that uses a third protocol;
a connection for an energy supply unit;
an energy distribution unit that is connected with the connection for the energy supply unit and with the contacts of the head module, wherein the energy distribution unit is embodied to supply the terminal module with electrical energy via the contacts of the head module and the contacts of the terminal module; and
an electronics module that is embodied to receive via the contacts telegrams transmitted from the terminal module, wherein the telegrams have the second protocol and the electronics module is further embodied to convert the telegrams into the third protocol and to output the converted telegrams via the first network interface;

wherein the head module is mounted on the hat rail, and wherein the terminal module is connected by means of its contacts with the contacts of the head module.

2. The system as claimed in claim 1, further comprising: a closure module mounted on the hat rail and embodied such that the closure module is connectable with the contacts of the terminal module and upon connection with the contacts of the terminal module the closure module forms an electrical current loop composed of the head module, the terminal module, and the closure module.

3. The system as claimed in claim 2, further comprising: other terminal modules, each of which is connected with an additional communication loop of an additional field device and is located between the head module and the closure module, wherein the contacts of the additional terminal modules contact such that the electrical current loop includes the additional terminal modules and wherein the additional terminal modules are embodied to forward converted telegrams of the terminal module and, to receive, to convert, and to transfer to the head module telegrams of their respective communication loop.

4. The system as claimed in claim 2, wherein the head module further includes an optical indicator, wherein the electronics unit of the head module is further embodied to checks for a presence of the closure module, and wherein the optical indicator is embodied in the case of presence of the closure module to emit an optical signal.

5. The system as claimed in claim 1, further comprising: a service unit connected to a second network interface of the head module and embodied to access a Web server of the head module and via the Web server to retrieve data from the head module.

6. The system as claimed in claim 5, wherein the electronics unit of the head module is further embodied to check for presence of terminal modules and to query identification information of terminal modules.

7. The system as claimed in claim 6, wherein the Web server of the head module is embodied to present the present terminal modules with their corresponding identification information and to provide the present terminal modules with their corresponding identification information for the query.

8. The system as claimed in claim 6, wherein the system is embodied in such a manner that the service unit enables a servicing of the field device, wherein the service unit is embodied to transfer a service telegram to the head module, wherein the head module is embodied to convert the service telegram into a telegram conforming to the second protocol and to transfer such to the terminal module, wherein the terminal module is embodied in such a manner to convert the telegram into a telegram conforming to the first protocol and to transmit such via the communication loop into the field device.

* * * * *